United States Patent [19]
Elliott et al.

[11] Patent Number: 5,610,915
[45] Date of Patent: Mar. 11, 1997

[54] SYSTEM AND METHOD THEREFOR OF VIEWING CALL TRAFFIC OF A TELECOMMUNICATIONS NETWORK

[75] Inventors: Isaac Elliott, Colorado Springs, Colo.; Jim Finucane, Bernardsville, N.J.; Louis Gottlieb, Colorado Springs, Colo.; Daniel L. O'Reilly, Colorado Springs, Colo.; Gary E. Johnson, Colorado Springs, Colo.

[73] Assignee: MCI Communications Corporation, Washington, D.C.

[21] Appl. No.: 405,988

[22] Filed: Mar. 17, 1995

Related U.S. Application Data

[63] Continuation of Ser. No. 351,211, Nov. 30, 1994, abandoned.

[51] Int. Cl.[6] .................................................. H04M 3/42
[52] U.S. Cl. ........................................ 370/259; 379/207
[58] Field of Search ...................... 370/68.1, 17, 94.1, 370/60, 110.1, 62; 379/88, 196, 201, 202, 112, 113, 114, 115, 116, 119, 126, 127, 134, 135, 137, 139, 207, 131; 348/16, 15

[56] References Cited

U.S. PATENT DOCUMENTS

| | | | |
|---|---|---|---|
| 5,222,120 | 6/1993 | Mcleod et al. | 379/196 |
| 5,265,155 | 11/1993 | Castro | 379/131 |
| 5,425,086 | 6/1995 | Hidaka et al. | 379/113 |
| 5,425,087 | 6/1995 | Gerber et al. | 379/113 |

Primary Examiner—Douglas W. Olms
Assistant Examiner—Dang Ton

[57] ABSTRACT

In a telecommunications network, to provide both statistical reporting functions and reporting on a call by call detail basis, a Traffic View Server (TVS) system is incorporated with a MCI Traffic Statistics (MTS) system. The TVS is responsive to instructions provided by subscribers so that reports may be provided on a given time period, at a given frequency and in a particular format, as instructed by the subscribers. Standard reports are delivered via E-Mail, fax or hard copy. A subscriber may obtain a static view of the traffic for a special service call number by communicating with the TVS. Moreover, a remote subscriber may download from the TVS a data file which contains raw call details and statistics that he can import to his own reports. Different types of call detail reports may be generated from the TVS.

35 Claims, 8 Drawing Sheets

SYSTEM AND METHOD THEREFOR OF VIEWING CALL TRAFFIC OF A TELECOMMUNICATIONS NETWORK

This is a continuation of patent application Ser. No. 08/351,211 filed Nov. 30, 1994, now abandoned.

FIELD OF THE INVENTION

The present invention relates to special service telephone call processing such as 800, 900 and "VNET" calls in a telecommunications network, and more particularly to a system for viewing the traffic of the calls to provide customers or subscribers with special service call disposition statistics and call detail information.

BACKGROUND OF THE INVENTION

In co-pending application Ser. No. 125,230 filed Sep. 23, 1993 now U.S. Pat. No. 5,537,611, the network management of special service calls which allows the management of the telecommunications network to oversee the network to ascertain traffic surges and provide traffic controls to alleviate network congestion is disclosed. In particular, the '230 application discloses the utilization of a Data Access Point (DAP) for storing information relating to different special service call numbers, information relating to subscribers who subscribe to the various services, and translation tables that provide the data needed to translate a special service call number into a real call number associated with a particular network switch. A processor associated with the DAP, referred to as a DAP Traffic Statistics (DTS), converts the collected traffic data into statistics data and forward the same to a compiler processor of an Integrated Network Management System (INMS). The INMS would provide reports containing the compiled statistics data for the special service call number to subscribers customer and the management of the telecommunications network. With the information from the INMS, a subscriber could readjust the parameters for a special service call number and reallocate the calls made to the call number to different destination stations. The management of the network, at the same time, can review the information from the DTS and reroute traffic in the network to avoid congestion or call blocking caused by any one of the special service call numbers. The information provided by the DTS, however, is limited in scope and does not provide data appropriate for some subscribers of the DTS service.

BRIEF DESCRIPTION OF THE PRESENT INVENTION

In support of 800 portability mandated by the Federal Communications Commission (FCC), an MCI Traffic Statistics (MTS) system was integrated with the existing DTS system to provide subscribers with special service calls, for example 800/900, call disposition statistics and call detail information. The service provided by the MTS system is referred to as MCI Traffic View (MTV) and provides subscribers with insight into their call attempts and completions, beyond current DTS reporting capabilities. The present invention Traffic View Server (TVS) system is incorporated into the MTV service to provide both statistical reporting functions and call by call details.

TVS provides reporting either hourly, daily, weekly, or monthly, depending on instructions placed by the subscriber. A number of different reports, for example 17, may be generated. These reports may be delivered via MCI Mail, fax or hard copy to the respective subscribers. A customer that subscribes to a special Perspective service may also directly download a data file of call statistics from the TVS via a workstation. The source of data for the MTS system is 800/900 Call Detail Records (CDRs) generated by the various network switches. These CDRs are collected by network Adjunct Processors (APs), associated with corresponding ones of the network switches. Once collected, the CDRs are delivered to the MTS system for immediate processing. Upon receipt of the CDRs from the APs, the MTS system will forward periodically, for example hourly, the call statistics to the TVS. The MTS system stores multiple hourly CDRs for each of the special service numbers.

For call by call details, the TVS system is supplied with Enhanced Call Detail Records (ECDR) by the MTS system. For the current embodiment of the instant invention, the statistical data is sent to the TVS system on an hourly basis, and the ECDR data is sent to the TVS system in near real time. These records are used to generate some additional different call detail reports. In addition, these ECDRs are the source of a Real Time Traffic Statistics (RTS) system that will be described in a co-pending application.

The TVS system delivers its outputs, as either reports or data files, to the subscribers, either by means of Personal Computers (PCs), computerized terminals, fax or hard copy output.

The TVS system is made up of a number of identical processors, so that from a hardware standpoint, there is no single point of failure and there is a 100% redundancy in all hardware. Thus, in the event of complete failover of the main processor, the application software would detect the failover thereof and automatically moves the application to one of the other available backup processors.

The system of the present invention is furthermore configured with a number of subsystems each of which adds to the refinement of this system. For example, a Circuit Availability Database (CADB) system is connected to the TVS system to provide state and country mapping for the CDRs stored in the TVS database. Another system that provides refinement to the reports generated by the TVS system is a Corporate Order Entry System (CORE) in which a subscriber can enter instructions to the TVS system to request that his report be sent to him, for example, at a certain time, frequency or manner. Yet another system that may be added to the TVS system is a Circuit Order Management System (COMS) which provides to the TVS system a file of maps showing the number of service locations and the ncode to a switch, trunk, or regular telephone number.

There are a number of ways in which a subscriber can interact with the TVS system of the present invention system. In particular, the TVS system is interfaced with a mail host, i.e. a message distribution center, for forwarding the reports to the subscribers through either MCI mail, fax or hard copy. In addition, by means of a computerized terminal or a personal computer equipped with a modem, a subscriber can directly link up with the TVS system or indirectly via the mail host, so that he can obtain the call details of a special service call subscribed by him for a particular time. In addition, the subscriber can download a data file containing the raw call details of the special service call for a particular period of time.

It is therefore an objective of the present invention to provide traffic statistics data as specialized reports and/or data files to subscribers who subscribe to the special service call processing service provided by the network.

Another objective of the present invention is to provide a subscriber the ability to download call statistics from the database of the TVS system so that he can format and design his own reports.

It is yet another objective of the present invention to provide a subscriber the ability to instruct the system to provide reports on a particular given time through a particular method.

It is yet a further objective of the present invention to provide reports to subscribers that contain greater call details of their subscribed special service calls than other previous systems and methods.

BRIEF DESCRIPTION OF THE FIGURES

The above mentioned objectives and advantages of the present invention will become more apparent and the invention itself will be best understood by reference to the following description of the invention taken in conjunction with the accompanying drawings, wherein.

DETAILED DESCRIPTION OF THE PRESENT INVENTION

An overall view of the traffic view system of the present invention is discussed with reference to FIG. 1. As shown, the FIG. 1 architecture basically starts with a plurality of switching means, such as for example a number of switches represented by switch 2, in the telecommunications network. Associated with each switch, for example switch 2, is an Adjunct Processor (AP) 4. One of the main functions of the AP is to perform billing. For each call routed through switch 2, AP 4 generates a Call Detail Record (CDR). The CDR is routed to an Operator Services System (OSS) network 6, which otherwise may be referred to as a X.25 network. Network 6 in turn is connected to a series of processors commonly referred to as Central Retransmitters (CR) 8. The outputs of the respective CRs 8 are provided to a Fiber Distributed Data Interface (FDDI) ring 10. The output of FDDI ring 10 in turn is connected to a MCI Traffic Statistics (MTS) system 12, which is situated in a platform to which another system, namely a DAP Traffic Statistics (DTS), may also reside.

Figure 1:
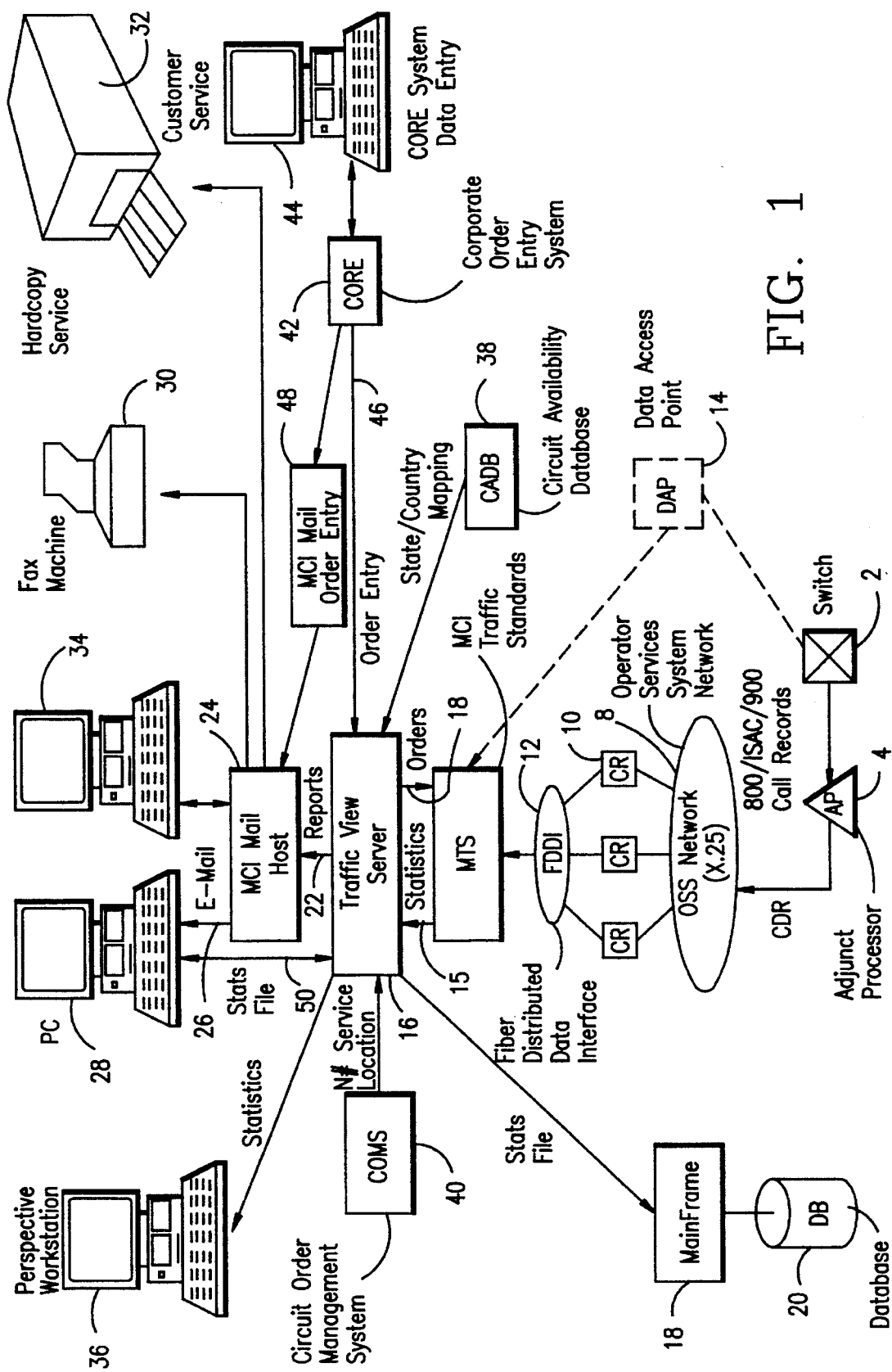
FIG. 1 is an overall view of the traffic view system of the instant invention.

DAP refers to a data access point such as DAP 14 shown in the dotted box of FIG. 1. In particular, DAP 14 is a processor system that provides routing information to switch 2. In addition, DAP 14 also provides information to the MTS (or the combination DTS/MTS system) for the traffic statistics monitoring mentioned in the background of the invention section, supra. A more detailed discussion of a DAP and the DTS is given in the aforenoted application Ser. No. 125,230, assigned to the same assignee as the instant invention, and whose disclosure is incorporated by reference herein. For the instant invention, it suffices to note that the platform to which both DTS and MTS reside is referred to only as the MTS system 12.

MTS system 12 is basically a system for counting the number of calls through the various switches. For the telecommunications network of the instant invention, calls are understood to be special service calls including but not limited to 800, 900 and "VNET". For the discussion of FIG. 1, it is assumed that MTS system 12 counts only 800/900 calls, or traffic.

On a periodic basis, MTS system 12 provides statistics data, also referred to as rolled up statistics, via line 15 to a Traffic View Server (TVS) system 16. As shown, MTS system 12 also receives orders, via line 18, from TVS system 16. For the embodiment of FIG. 1, rolled up statistics are output from MTS system 12 to TVS system 16 at predetermined time intervals such as for example every 60 minutes. It should however be understood that the time intervals in which statistics are rolled up from MTS system 12 to TVS system 16 may be varied.

The process by which rolled up statistics are periodically provided from MTS system 12 to TVS system 16 basically occurs as follows. For a given time period, for example every hour, statistics for customers (subscribers) who have subscribed to the service of the present invention system are accumulated and a customer rolled up peg count message is produced. For the embodiment of FIG. 1, the accumulations are for hourly intervals, with the understanding that future intervals may be set to any time period, for example 20 minute increments. A MTS stats compiler (to be discussed with reference to FIG. 2) writes the customer peg count messages into a traffic view server queue. Note that for the FIG. 1 embodiment, only the hourly message is supported.

For the FIG. 1 embodiment, in brief, an example of rolled up statistics of a 800 number for a given subscriber may contain the following data: that 500 call attempts were made to that 800 number of the subscriber, that 400 of those calls were completed, 50 were not completed (incompletes) and 50 of those calls were blocked. Additional rolled up statistics data may include the destination terminations and the originating Numbering Plan Area (NPA) of the calls. These statistics are stored as records in TVS system 16.

For the FIG. 1 overall view, it suffices to state that TVS system 16 comprises a number of processors which are represented by a main frame host system 18. Connected to the processor system 18 is a storage means, for example a database system 20 which comprises a plurality of memory disks or other storage mechanisms. A more detailed discussion of the hardware components of TVS system 16 and its database system is given, infra. The specific configuration of the database system to be used with the TVS system 16 is given in co-pending application Ser. No. 08/350,186 filed Nov. 30, 1994, entitled "Relational Database System", assigned to the same assignee as the instant invention.

Continue with FIG. 1. As shown, there are a number of systems communicatively coupled to TVS system 16. In particular, connected to TVS system 16 to receive its outputs, referred to as reports, via line 22, is a data distribution system, also referred to as MCI Mail host 24. Mail host system 24 is a proprietary system of the MCI Communications Corporation (MCI) and is capable of sending out E-Mails, via line 26, to a conventional PC 28 equipped with a modem and appropriate communications software. Mail host 24 can further distribute reports, or data files, from TVS system 16 to a fax machine 30 or as a hard copy message, represented by printer 32, to a subscriber.

Also shown to be connected to mail host 24 is a computer terminal represented as another PC 34. PC 34, interchangeable with PC 28, may be used to obtain a "probe" report from TVS system 16 or it can obtain Enhanced Call Detail Records (ECDR) from TVS system 16. From PC 34, a subscriber can "probe" into TVS system 16 so that he can retrieve a static picture for his special service number for a specific period of time at a specific date. For example, the subscriber may be a TV programmer who runs a special program on a given day where he asks the viewers to dial a 800 number. If the subscriber wants to see exactly how the program did in terms of audience viewership for the previous hour, he can obtain a static picture of that previous hour by using the probe feature, to thereby ascertain the type of business he could expect. For the probe feature, the subscriber, as shown in FIG. 1, is linked to mail host 24. Alternatively, it should be understood that a subscriber may link directly to TVS system 16, per illustration of line 50 between PC 28 and TVS system 16.

Further shown connected to TVS system 16 is a Perspective work station 36. Work station 36 is representative of a plurality of work stations which may be used by the different subscribers of the service of the instant invention to directly access TVS system 16 to retrieve data which the subscribers can then format or design as their own reports, for example inputting data into their spreadsheets. The data file retrieved by work station 36 is referred to as a flat file.

Also connected to TVS system 16 is a Circuit Availability Database (CADB) 38 which periodically provides TVS system 16, more specifically database 20 of TVS system 16, mapping data to correlate NPAs to the different states and localities within the states, and country codes to the different countries for further adding call details for the CDRs.

Also shown connected to TVS system 16 is a Circuit Order Management System (COMS) 40 whose function, for the FIG. 1 embodiment, is to provide a file of maps of the service locations, and the ncodes to switches, trunks, or regular telephone numbers.

Further connected to TVS system 16 is a Corporate Order Entry (CORE) system 42. CORE system 42 receives its input from subscribers via a CORE system data entry system such as for example a terminal or PC 44. In particular, a subscriber can input instructions to CORE system 42 which in turn inputs the instructions as order entries via line 46 to TVS system 16. Some of the data provided by the subscribers to CORE system 42 may include the type of reports the subscribers like to receive, the number of reports the subscribers want, the frequency and how the reports should be sent, and where the reports should be delivered to. With respect to the method in which the reports are to be delivered, CORE system 42 sends instructions to a MCI mail order entry system 48, which in turn forwards the instructions to mail host system 24. Consequently, a subscriber who has instructed TVS system 16 that it should sent to him his reports in a E-Mail format would receive his report in a PC format such as that represented by PC 28.

Figure 2:
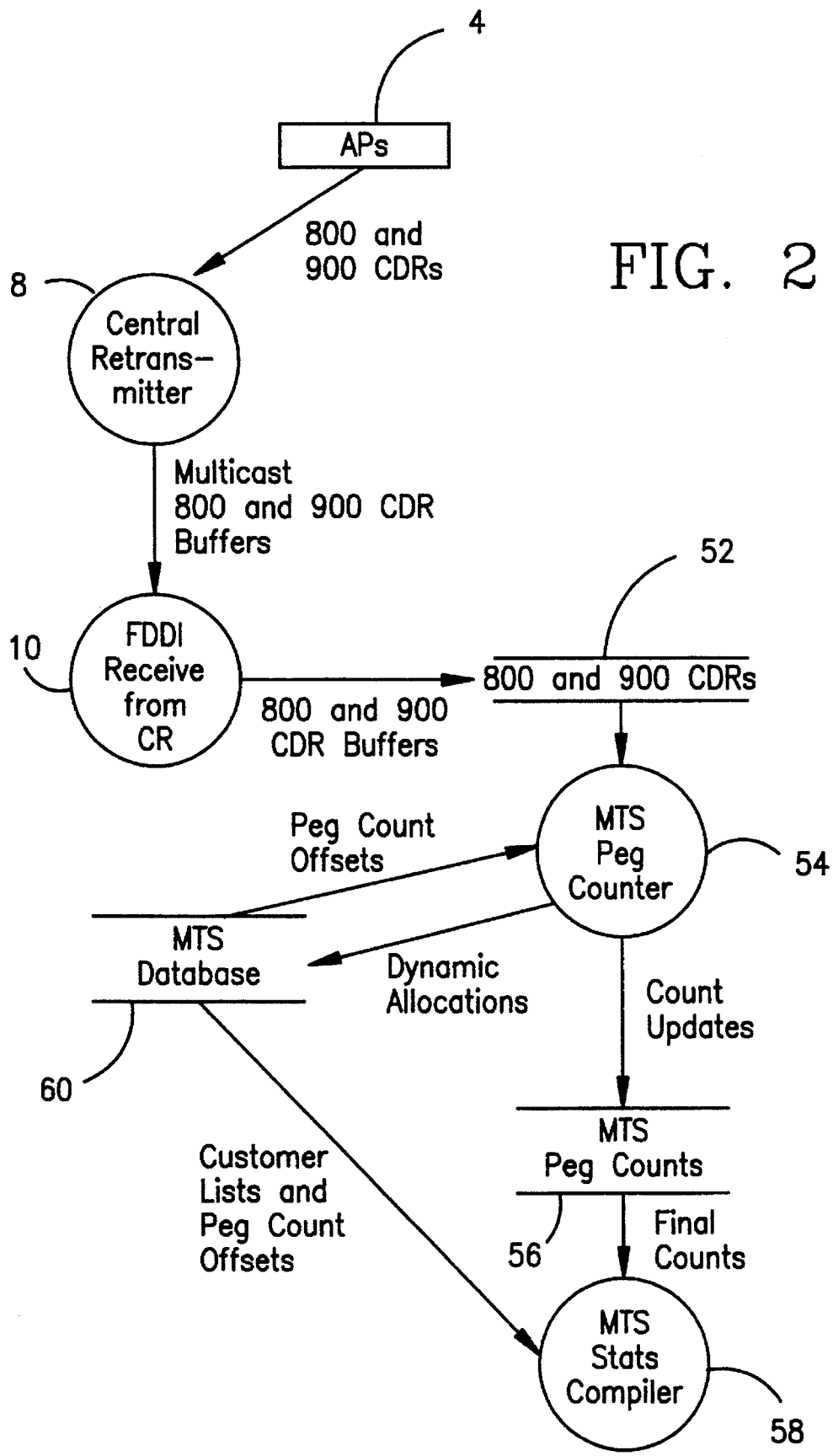
FIG. 2 is a diagram illustrating the functions of the MCI traffic statistics system of the present invention traffic view system.

The transmission of data between APs, such as AP 4, and MTS system 12 is given with reference to FIG. 2. As shown, 800 and 900 CDRs are collected from APs 4 and routed to central retransmitters 8, which are protocol conversion processors. In essence, CRs 8 convert the data from APs 4, which are VAX OSI Transport System (VOTS) messages that are delivered on the X.25 network, into a multi-cast M messages. (OSI is Open System Interconnection).

MTS system 12 collects CDRs from all APs. The CDRs are collected and buffered at each AP, and sent to MTS system 12 using the OSI class 4 Transport Service (OSI TP4). The CDRs (per buffer) are received at MTS system 12 by a process called the AP OSI communication manager, or AP OSI CM. The AP OSI CM process is responsible for communication between MTS system 12 and the APs. This process runs simultaneously on all of the processors (to be discussed later) of MTS system 12 where each CM receives CDRs from a specific number of APs over OSI transport connections on the OSS NET. This involves establishing and maintaining sessions to receive 800/900 number CDRs from the APs. As each CDR buffer is received from the APs, it is forwarded to the application being run on the processors of MTS system 12. This is done by transferring each buffer (of the CDRs) to an ethernet transmit process, also running on the MTS communication servers. The ethernet transmit process then uses the ethernet multi-cast protocol to send the buffer to the application running in MTS system 12.

In terms of the external interfaces, the AP OSI CM process receives CDR messages from the APs by establishing a transport connection via the Packet Net System Interface (PSI), which is used to establish Shared Virtual Circuits (SVCs) over the OSSI NET 6. The CM interfaces to the ethernet transmit process over a Virtual Memory System (VMS) mailbox where the CM puts the AP CDR message to be multi-casted on the MTS lan. The AP OSI CM maintains a VMS global section where various statuses and perform statistics are kept and updated.

Each AP, as was discussed earlier, is collocated with a switch 2. The AP receives all CDRs generated by switch 2. The records generated by a switch can be in many different categories: for example Call Detail Records (CDRs), Private Network Records (PNRs), Operator Services Records (OSRs), Private Network Operator Services Records (POSRs), and Switch Event Records (SCRs). For the understanding of the instant invention as exemplified by the embodiment of FIG. 1, the only records that are forwarded to MTS system 12 by each AP 4 are the originating switch 800 and 900 CDRs. A filtering algorithm is employed at each AP for filtering the appropriate CDRs.

In sum, Transport Service Data Units (TSDUs) are received by the AP OSI CM. Each of the TSDUs contains CDRs from the AP in a format whereby it contains a AP MTS header which may be for example 16 bytes long. The AP MTS header may contain a switch ID identifying the switch where the CDR is from, the CDR count and a filler for filling unused bytes. The AP MTS header is followed by up to 23 CDRs, each of which being 64 bytes long. These multi-cast 800 and 900 CDRs are forwarded by CRs 8 to FDDI ring 10.

The process performed by FDDI 10 is as follows. FDDI 10 receives the CDRs for MTS 12, and buffers Application Data Field (ADF) message pairs, fraud messages and call detail records from the CRs 8. These CDR messages are put in a queue for the MTS peg counter 52. The CDRs from counter 52 are then forwarded to a MTS peg counter 54 in MTS system 12. The outputs from MTS peg counter 54 are provided to a MTS customer service database 60 and also MTS peg counts buffer 56. The process under which MTS peg counter 54 operates is as follows.

First, the MTS peg counter enhances the call detail record by performing data look-ups on the feature group C, virtual trunk, direct termination overflow and international SAC databases. For the received call records, the MTS peg counter does a database look-up using the pretranslated dialed digits as the key. The look-up will yield the virtual memory address of the necessary peg count storage areas for each 800 number, and a list of counting services to provide for the CDR. There is a linked list header for each possible kind of peg count that an 800 number can have.

MTS peg counts are stored as a virtual memory address of a linked list header. There are two linked list headers per 800 number and peg count type—one for current peg count statistics and the other for the inactive peg count statistics reporting by an MTS statistics compiler 58. Actual peg counts are stored in linked lists, indexed by hour. Call record time points are normalized to Universal Coordinated Time (UCT) based on the switch/AP time. Because of the call record transfer delay between the switch/AP and MTS, MTS needs to store peg counts for multiple hourly intervals for each 800 number. Hourly intervals are sorted in reverse chronological order to expedite peg count storage searches. The peg counter continues to store peg counts for each hourly interval for a configurable interval after the reporting interval. Assuming the initial setting to this configurable interval is 10 minutes, the MTS peg counter will continue to store peg counts for each hourly interval unit 10 minutes after the reporting interval is over.

Dynamic allocation is done by the MTS peg counter with a "Doggie Bag" for temporary storage of incoming call records that require a database update before processing. When an 800 number or a termination is not found, the call record is stored in the MTS Doggie Bag. The MTS peg counter requests the database lock, with asynchronous notification through an AST routine. When the lock is granted the AST routine sets a flag indicating the lock is granted. After each buffer of incoming call records has been processed, the MTS peg counter makes the necessary database updates, then processes the record normally, bumping up the appropriate 800 number peg counts.

MTS total call counts provide a sugary of total minutes and call completions broken down by the 800 number. These counts can be rolled up to TVS system 16 to provide total minutes and the call completion ratio by customer ID. Total counts include:

Total Completions
Total Call Duration
Total Attempts
Total Switch Controlled Calls (No Action Code Received)
Total NCS Blocked (Action Code 30 Received)
Total NCS Rejected (NCS Failure Action Code Received)
Total Network Blocked (All Routes Busy)
Total Supp Code Blocked
Total Out of Band Blocked The call completion ratio can be determined for a given 800 number and rolled up under the customer ID to provide call completion statistics, and total call minutes on a customer by customer basis.

$$800 \text{ Call Completion Ratio} = \frac{\text{Completions}}{\text{Attempts-(Switch Controls} + NCS \text{ Blocks} + NCS \text{ Failures} + ARBs)}$$

MTS NPA counts are compiled and stored hourly as a block of 160 NPAs. The NPA counts include:

Originating NPA
Total Attempts per NPA
Total Completed Calls per NPA
Total Calls Not Delivered (Blocked) per NPA
Total Attempts for International Originations
Total Completed Calls for International Originations
Total Calls Not Delivered (Blocked) for International Originations MTS NPA-NXX counts are compiled and stored hourly as a block of 160 NPAs with their associated NXXs. The NPA-NXX counts include:

Attempts from International Originations
For each Originating NPA . . .
    Attempts for each unknown NXX (for FG-C Originations)
For each NXX of Origination
    Attempts from that NXX MTS counts for an 800 number are broken down by termination and compiled hourly. Call statistics for terminations include:

Termination Type
Termination Address
Total Completions
Total Call Duration
Call Disposition Call dispositions indicate the cause of an incomplete call. Terminating call dispositions include:

Total Short Calls. Short calls are calls lasting less than 4 switch ticks with no answer detected. This typically indicates a busy condition. (Each Switch tick is presumed to be 3 seconds).
Total Didn't Wait. Didn't Wait calls are call lasting from 4 through 8 switch ticks with no answer detected. This typically indicates a call not answered within 4 ringing cycles.
Total Didn't Answer. Didn't Answer calls are calls lasting beyond 8 switch ticks with no answer detected. This typically indicates a call is not answered within 6 ringing cycles.

Every hour, the MTs peg counter wakes up MTS statistics compiler 58, which then performs sequential traversal of MTS customer service database 60 to generate statistics for every 800 number. The MTS service type (a field in the MTS customer service record) informs the statistics compiler which statistics are being kept for this 800 number (i.e. 800 totals, termination counts, NPA counts, NPA-NXX Counts). A data driven MTS statistics compiler records the services a particular 800 number is registered for; including reporting interval (hourly), statistics destination (MTS server), priority (real time, non-real time), and time offset (usually zero) for statistics delivery.

The MTS statistics compiler 58 reads MTS customer service database 60 in priority order, so statistics are processed for all real time 800 numbers first, followed by statistics for the non-real time 800 numbers. The priority feature allows MCI 800 traffic view subscribers who are signed up for hourly data to gather their data first, while subscribers who only want daily, weekly or monthly reports from the TV server of TVS system 16 will get their data later. TV server may also be referred to as a TARS (Traffic Analysis Reporting System) server.

For each 800 number found in the MTS customer service database 60, MTS statistics compiler 58 finds the matching peg counts in memory and constructs an "MTS Peg Counts Message for and 800/900 Number". A MTS send out routine is invoked to send each message to TVS system 16.

The "MTS Peg Counts Message for an 800/900 Number" consists of a fixed message part and a variable number of optional parameters. The fixed message part identifies the 800/900 number for which the statistics are being reported, the time interval the statistics are from and other key information. The optional parameters that are reported for a given 800 number depend upon the service identified for the 800 number in MTS database 60. The following table identifies the service types and their corresponding optional parameters:

| Service Type | Optional Parameters in B.1 Message |
| --- | --- |
| 1. Total Service | EF - MTS Totals Counts |
| 2. Termination Service | EF - MTS Totals Counts |
| | EC - MTS Counts by Termination |
| 3. Standard Service | EF - MTS Totals Counts |
| | EE - MTS Counts by NPA |
| | EC - MTS Counts by Termination |
| 4. Demographic Service | EF - MTS Totals Counts |
| | EE - MTS Counts by NPA |
| | ED - MTS Counts by NPA-NXX |
| | EC - MTS Counts by Termination |

MTS statistics compiler 58 does not begin reporting on an hour until a configurable interval (default 5 minutes) after the hour. As each statistics message for a given hour is constructed and sent, MTS statistics compiler 58 frees any memory used to hold peg counts for the current 800/900 number. This memory is returned to a common pool of free memory, available for use by the peg counter as needed.

After sending all of the required statistics messages for a given hour, MTS statistics compiler 58 sends an "MTS Switch/AP Report Status Checkpoint Message" to the server. This message serves two purposes: (1) it informs TVS system 16 that all messages for an interval have been sent; and (2) it shows TVS system 16 how accurate the 800/900 number data it received is, by showing how far behind each Switch/AP is in sending statistics messages to the MTS.

Ideally, the "Last Call Record Disconnect" time point for each Switch/AP is sent after the end time of the hourly interval. That means that the Switch/AP is keeping up with traffic levels, but does not necessarily mean that the data reported for an 800 number is entirely complete. There is still the possibility that long duration calls have not disconnected, and therefore will not be reported until the next hour.

Also after generating 800 number statistics messages, the MTS statistics compiler 58, generates an "MTS Network Statistics Message". This message is not sent to TVS system 16, but is only written to the test files or the test multi-cast address. The message is useful for network management purposes, for gauging traffic levels throughout the day and for determining the transition mix at intelligent network platforms such as Network Control System (NCS).

After all statistics messages are generated for an hour, MTS statistics compiler 58 hibernates, waiting to be awakened again by the MTS peg counter 54 for the next hour. Note that although "hourly interval" has been described as the basis on which MTS statistics compiler 58 runs, in actuality, the interval is completely configurable to be any reasonable time period.

Figure 3:
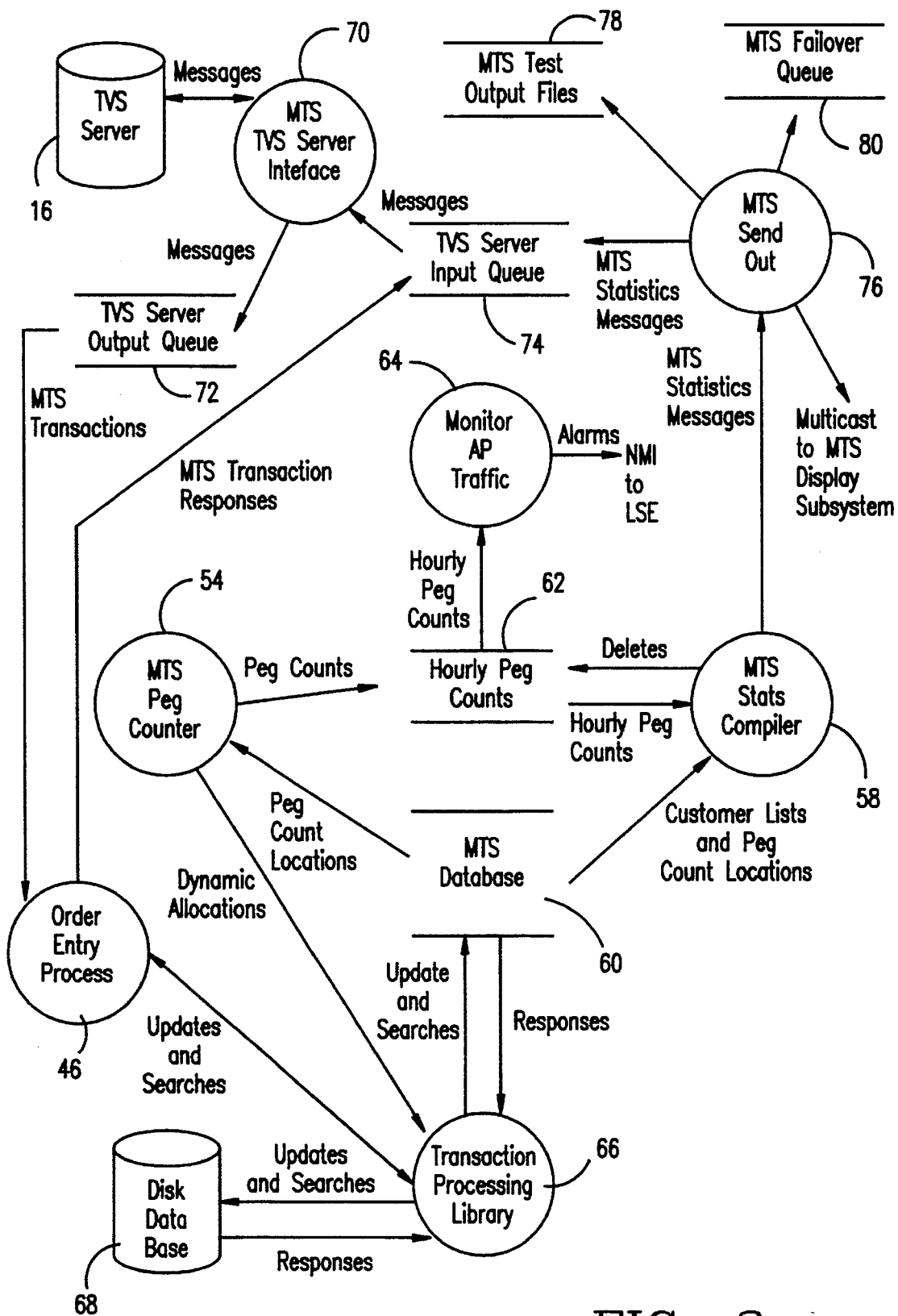
FIG. 3 is a diagram illustrating the different functions of the MCI Traffic Statistics (MTS) system, in receiving data and transmitting that data to the Traffic View Server (TVS) of the traffic view system of the present invention.

FIG. 3 provides a more comprehensive view of the different operations of MTS system 12, and the relation of those operations to the exchange of information between MTS system 12 and TVS system 16.

In particular, as shown in FIG. 3, the hourly peg counts, stored in buffer 62 from MTS statistics compiler 58, is monitored in Monitor AP Traffic process 64. Process 64 is responsible for sending alarms to the Network Management Interface (NMI) and the Local Support Element (LSE) whenever an AP fails to send messages to MTS system 12 within a preconfigured time period. For the embodiment of this invention, the time period is assumed to have a default setting of 5 minutes. This process continues to send alarms every 5 minutes for as long as no messages are received from an Also with respect to the instant embodiment, the first two alarm messages are assumed to be sent as warnings. Further the third alarm message is sent to indicate that there is in fact an error.

Data is exchanged from MTS database 60 to a Transaction Processing Library (TPL) 66. TPL 66 is a centralized, table driven set of software routines that are callable by any process for modifying or searching through its associated memory or disk database 68. TPL 66 is called through an TPL 66 interface by the MTS administration processes. MTS statistics compiler 58 and peg counter 54 call hash routines directly to perform database searches. All other functions performed by those processes and all of the other processes access TPL directly through a TPL controller. TPL also allows a transaction to back out from the database when any part of the transaction fails.

With respect to MTS System 12, TPL 66 maintains these databases:

Customer Definition,

Monitored Customer,

Termination by 800/900 number,

Termination counts by originating NPA,

MTS Customer Service,

MTS 800 Service Types,

MTS Network Service Types,

MTS Destinations,

MTS Network Service.

TLP 66 maintains these lists:

Real time customer list; and

Non-real time customer list.

TPL 66 maintains these arrays:

Switch/ARU Array

DAP Transaction Server Array

NPA/Location descriptions

TPL maintains MTS control block.

For MTS system 12, among other functions, TPL 66 supports the following:

Add an 800/900 number

Delete an 800/900 number

Search the Customer Definition file for a record

Add a termination to an 800/900 number

Delete a termination for an 800/900 number

Search the "Termination of an 800/900 number" file for a record

Update a "Termination of an 800/900 number" record

Add a switch/ARU

Delete a switch/ARU

Add a transaction server

Delete a transaction server

Initialize TPL

Search the Termination by 800/900 number file (TRMN00)

Update an NPA

Update a switch

Search for a switch
Update the MTS control block settings
Update an MTS monitored 800/900 number
Search for an MTS monitored 800/900 number
Add an MTS feature group C record
Delete an MTS feature group C record
Search for an MTS feature group C record In addition to corresponding with MTS database 60 and its associated disk database 68, PPL 66 also corresponds with an order entry process, such as that represented by line 46 (FIG. 1) performed by CORE system 42. Specifically, order entry process 46 is responsible for taking MTS transactions received from the TVS system 16, and applying the appropriate updates to MTS database 20. As shown in FIG. 3, the TVS transactions are received from the TVS server process 70 via a TVS server output queue 72. The order entry process 46 then invokes an application from TPL 66 to execute the transaction. A response is received from TPL 66 and a MTS transaction response message is constructed and sent back to TVS server interface 70 via a TVS server input queue 74.

The MTS/TVS server interface process 70 is responsible for detecting link outages between the MTS system 12 and the MTS server. Upon link failure, MTS server interface 70 archives MTS statistics messages in a safe stored queue. The archive messages are sent in a First In First Out (FIFO) order when the link resumes normal operation.

If failover occurs during statistics compilation on a primary MTS node, MTS/TVS server interface process 70 begins to read messages from MTS statistics compiler 58 and send the messages to MTS system 12. If failover occurs when statistics compilation is complete, there should be little or no data in the MTS (TVS) server queue for MTS server interface process 70 to read.

The MTS/TVS server interface 70 also is responsible for receiving MTS transaction messages from the server in system 12 MTS. Incoming MTS transaction messages are placed in TVS server output queue 72 for the order entry process 46 to read and process.

Further with respect to FIG. 3, note that the TVS server input queue 74 has provided as one of its inputs MTS statistics messages from a MTS send out process 76. The MTS send out process 76 is a central routine that sends out all MTS output messages. MTS send out process 76 is able to send messages to the TVS server, multi-cast to a MTS display subsystem (not shown) and to MTS test output files 78. Moreover, as was mentioned previously, any failover messages are sent via MTS send out process 76 to a MTS failover queue 80.

The different types of MTS statistics are listed hereinbelow.

MTS incoming statistics:
  The number of call detail records received broken down by, message type, messages with invalid transaction IDs, and counts of the message buffers that are dropped. (Each buffer has a sequence, number. When a buffer is received out of sequence this count is incremented)
  Total current MTS TPS,
  MTS Monitored 800/900 numbers TPS,
  Peak MTS TPS since monitoring was initiated,
  A real time bar graph showing the current MTS TPS, and
  A count of the number of TVS server transactions received, a count of how many of them caused failure responses, and a count of how many of them caused success responses.

MTS system statistics:
  Total current MTS TPS;
  MTS monitored number TPS;
  Output messages sent to TVS server;
  Output messages sent to NMI;
  Number of MTS monitored numbers broken down by service subscription:
    800 totals counts
    800 termination counts
    800 NPA counts
    800 NPA/NXX counts
  How much memory has been allocated, used, and is available for each of the databases, files and peg count areas.

MTS outgoing statistics:
Output configuration
  800 number and termination dynamic allocation flag
  Termination dynamic allocation only flag
  Send output to TVS server
  Send output to MDS
  Send output to test output file
  Send output to remaining 5 alternate destinations
Output to the TVS server broken down by message type;
Dynamic allocation alarms broken down by database type;

MTS current peg counts:
Monitored 800/900 numbers
Termination for a specific 800/900 number
NXX counts for a specific 800/900 number
AP Statistics counts
Network statistics counts With reference to FIG. 4, the operation of TVS system 16, as represented by its TVS server, is discussed. As shown, TVS server 16 interfaces with a number of systems, among which include MTS system 12. Insofar as the interfacing between MTS system 12 and TVS server 16 is of import, a discussion thereof is given herein.

In particular, the MTS and TVS systems, more specifically their respective servers, exchange information via a pair of communications managers (CM). These are the MTS send CM and TVS receive CM. The processes performed by the two communications managers implement a client/server arrangement between the MTS and the TVS systems. Together, the two communications managers (processes) provide a bidirectional data transfer path between the MTS and TVS systems. Each CM has an input and output queue. A message written to the input queue of one CM is transmitted to the other CM and placed in that CM's output queue.

The MTS send CM accesses the client in the client/server arrangement, as it is responsible for establishing a transport connection between the two processes. The TVS receive CM acts as the server, as it accepts transport connections from one or more MTS send CM clients.

The communication mechanism between the MTS and TVS systems is via an OSI class 4 (or OSI TP4), an error detection and recovery transport server that provides reliable full-duplex, connection oriented data transfer between OSI-compliant systems. For the connection, VLTS is used.

There are two data flows between the two systems, namely a call completion statistics and call detail data flow from the MTS to TVS system, and an administrative control messages flow from the TVS to MTS system. The call completion statistics messages and call detail messages make up the great bulk of the traffic. Since there is a large volume of call statistics and call detail to be quickly transferred and the destination queue on the TVS system is of finite size, a sliding window protocol is used on top of the transport layer to allow rapid data transfer and to avoid over filling the output queue of the TVS server. The administrative control message volume and timing requirements are such that a windowing mechanism is not employed from the TVS CM to the MTS CM.

Thus, the MTS send CM functions as follows:

1. A transport connection is established to the TVS receive CM.

2. An asynchronous read is posted on the transport connection.

3. A series of asynchronous reads, determined by the window size, is posted on the input queue.

4. When a message is placed in the input queue, it is removed from the queue and written to the transport connection.

5. When an acknowledgement message is received from the TVS receive CM over the transport connection, another read is posted to the input queue and the read is reposted to the transport connection.

6. When an order entry message is received from the TVS receive CM, it is placed in the output queue and another read is posted on the transport connection.

The TVS receive CM functions as follows:

1. The receive CM accepts a transport connection from the send CM, and posts an asynchronous read to the connection.

2. An asynchronous read is posted to the input queue.

3. Messages are read from the transport connection, placed in the output queue, and an acknowledgement message is written back to the transport connection.

4. Messages are read from the input queue and written to the transport connection.

Both CMs keep link status information and transaction peg counts in a global section. A monitor program is supplied with each CM to map to this global section and display the status and transaction information.

Return to FIG. 4. As shown, the server of MTS system 12 sends a plurality of MTS messages to the server of TVS system 16 via the MTS Message line 82. Specifically, for the instant embodiment, the MTS server provides 800/900 call dispositions and call detail statistics to the TVS server. The following are the type of call dispositions sent: total short calls (including busy calls), total did not wait calls, and total did not answer calls. The following call detail statistics are extracted from the switch call record information elements: total completions (answered calls), total call duration (call minutes), total attempts, totals by terminating address, totals by NPA, totals by NPA-NXX, total switch controlled blocks, total network block calls.

The following noninclusive information for Enhanced Call Detail Records (ECDR) are also sent from the MTS system 12 to TVS system 16 in a steady stream: dialed number, calling number, output digits, originating switch, originating trunk, call origination time (TP1), connect time (TP3), answer time (TP6), disconnect time (DP7), call duration, ring duration, originating MPA, disposition, intended termination type/address, actual termination type/ address, corporate ID, origination country code, originating port ID. In addition to providing call details to TVS system 16, MTS system 12 also sends messages to TVS system 16 via line 82. Some of these messages may include a message that the system is falling over from one node to another. It could also be a response message to an order entry message that was sent to the TVS system 16 by CORE system 42. It could further be a check point message sent at the end of every hour after the MTS server has sent all of the statistics, and that those statistics are indeed all of the statistics to be received from the past hour.

A second link connecting MTS system 12 and TVS system 16 is a MTS order entry message line, designated 84. This is when the TVS system has received an order from CORE system 42, and the TVS server has to send a message to the MTS server to instruct MTS system 12 to gather the data required, for example, for a specific 800 number. In other words, the message from the TVS server requests the MTS server to capture data for the specific 800 number at a specific level, of which there are four for the instant invention.

The first level is a capture statistics only level which provides information on call attempts. It is a summary information level that indicates, for example, that there are these many calls, these many calls were completed, these many calls were incomplete calls, and these many calls were blocked. The second level provides all of the information provided in the first level, and information relating to the terminations where the completed calls went. The third level is a combination of the first and second levels and the addition of the originating NPA. The fourth level includes the information of all of the first to third levels plus the NXX (exchange code) for origination.

A third link 86 that connects the MTS server to the TVS server is the MTS fallover response message line. This is the connection used by the MTS system 12 to inform TVS system 16 that there has been a fallover from a first processor of MTS system to its backup processor. In essence, MTS system 12 in actuality comprises of two processors that are mirror images of each other. Thus, if one of the processors breaks down, the other processor takes over. And link 86 provides an indication from the MTS system 12 to the TVS system 16 that the backup system has taken over.

Also communicating with the TVS server is mail host 24. As was discussed previously, mail host 24 in essence is a system through which the reports from TVS system 16 are sent to the different subscribers. These reports can be sent via E-Mail, fax or as hard copies. A request for mail is sent by mail host 24 to the TVS server via line 88. There are two types of mail requests. One is a probe where the customer requests a report for a specific service call number, for example an 800 number for a specific time period at a given date in a summary format. In other words, the number of calls that went to the specific 800 number, the number of calls that were completed, the number of incompletes and the number of calls that were blocked. The other type of request from mail host 24 to the TVS server is a retransmission request when the subscriber has not received his report. For whatever reason the mail request is forwarded to a help desk of the TVS system so that the subscriber can request that a duplicate report be recreated and retransmitted to him. To answer the requests, the TVS server provides responses to Mail Host 24 via line 90.

A Circuit Availability Database (CADB) 38 is connected to the TVS server by means of line 92. In essence, CADB 38 provides the TV server a file on a periodic basis that contains information which allows the TV server to map the NPAs to states, NPNX to cities and other localities within the states. The file also provides mapping information to the TVS server to map country codes to country names, for example 44 being representative of the United Kingdom. It is this information from CADB 38 that the TVS server uses for outputting reports that provides answers to the subscriber on where calls to his special service call number come from.

Figure 4:
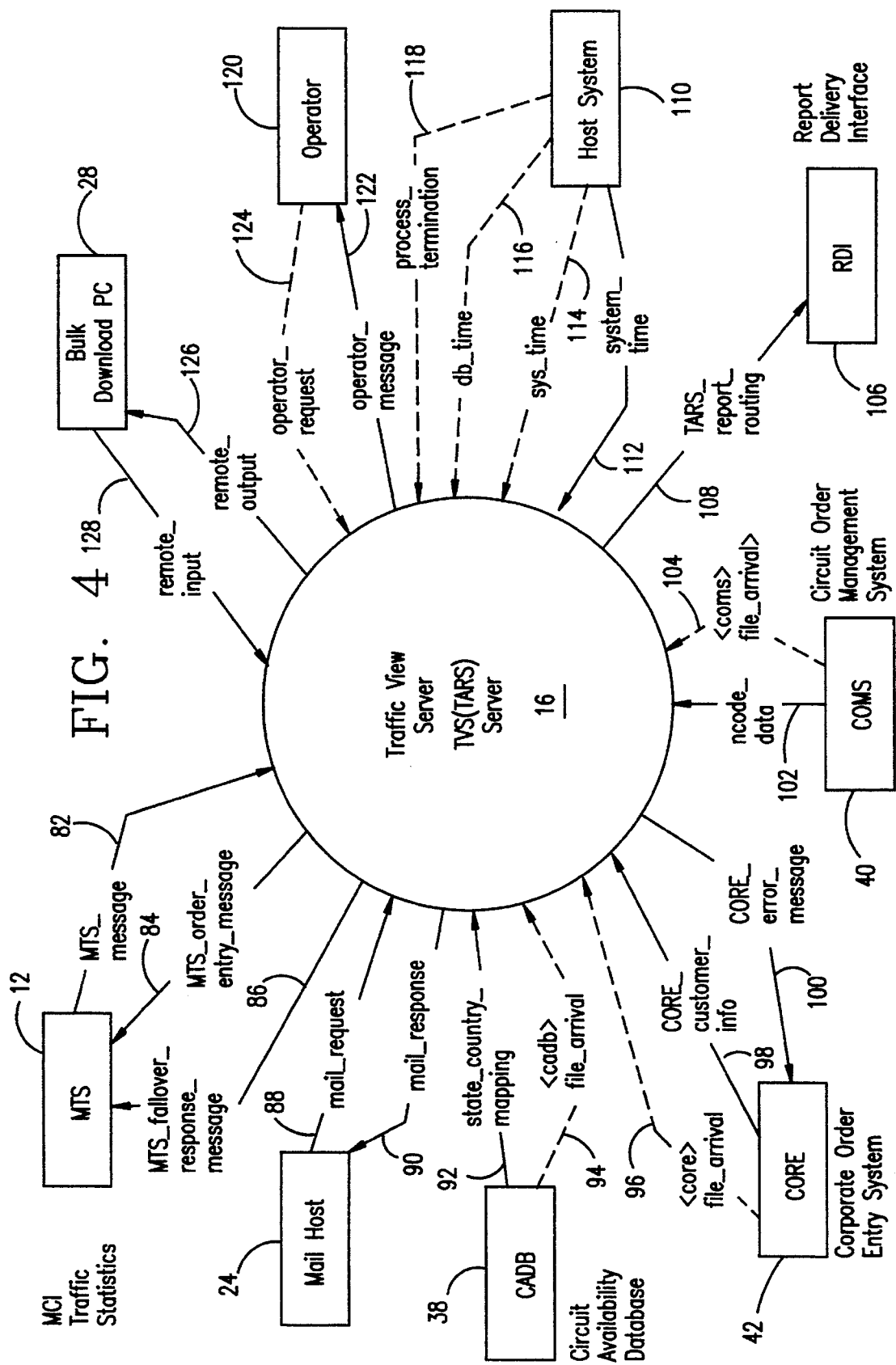
FIG. 4 is a diagram illustrating the functional relationships between the TVS system and the various systems connected thereto in the traffic view system of the present invention.

Also shown connecting CADB 38 to the TVS server is a dotted line 94. For our discussion, the dotted lines on FIG. 4 represent triggers that indicate that something has happened. For example, line 94 indicates that the file from CADB 38 has arrived at the TVS server and that the TVS server needs to process it.

CORE system 42 is connected to the TVS server of TVS system 16 via lines 96, 98 and 100. Line 98 represents a customer information line through which files containing orders for reports, or orders to turn off reports as the case may be, are provided from CORE system 42 to the TVS server. Line 96 is thus simply a trigger that shows that a CORE file has arrived and that the TVS server should begin to process it. Line 28, on the other hand, is a CORE error message line from the TVS server to CORE system 42. This line is used by the TVS server to transmit to CORE system 42 an indication that a record of a file being processed by the TVS server has been rejected. For example, the TVS server may reject a record because it has an incorrect address or that it does not have any phone number with it. In sum, the interaction between TVS system 16 and CORE system 42 is as follows. A file is sent from CORE system 42 to TVS system 16. A trigger is then sent by CORE system 42 to the TVS server to inform the latter that the file has arrived. The TVS server then processes the file, looks for any error, and if found, an error is sends a message back to CORE system 42 to inform it of the error. At approximately the same time, the order entry information is sent by the TVS server to MTS system 12 via line 84.

The TVS server also interacts with Circuit Order Management System (COMS) 40. It does so via lines 102 and 104. COMS system 40 in essence provides an ncode or service location data to the TVS server via line 102. An ncode is an eight digit character, the first character of which being always N and the remaining seven characters being always numbers. It is also referred to as a service location by which a subscriber can determine the termination point of a call. For example, when a subscriber sees a bill for an 800 number, he usually does not see the termination point from which the call originates. Rather, he will see that his 800 number (for example N 555–1111) had received so many call attempts. The termination report provided to a subscriber allows the subscriber to compare the report with his invoice for any discrepancies. For example, if the telecommunications network company has billed the subscriber for 500 calls while the report indicates that only 495 calls were made, the subscriber can then find out from the company why there is a discrepancy of 5 calls. Line 104 is a trigger that informs the TVS server that the file from COMS system 40 has arrived.

The TVS server is also connected to a Report Delivery Interface (RDI) 106. RDI 106 is a part of the MCI mail host system 24. It is broken out in FIG. 4 to show that reports actually go to an interface from the TVS server, via line 108. To elaborate, the TVS server does not know how to create an MCI mail message, even though it creates the report and knows which subscriber is supposed to get the report. Thus, a message is send to RDI 106 informing it that here is a file containing the body of the report and the address for which the report is to be sent. RDI system 106 then takes that report file, the address (or a list of addresses) and creates a mail message. This mail message is then provided to mail host 24 so that it can be delivered as either an E-Mail, fax or hard copy message.

The next system that communicates with the TVS server is a host system 110, which is the TVS system itself. Host system 110 in essence is the operating system where certain information required for operation of the TVS server is provided. For FIG. 4, it is assumed that the TVS server is in fact an application being performed by host system 110. Host system 110 provides a number of triggers to the TVS server for further processing. For example, via line 112, host system 110 provides a system time to the TVS server so that the TVS server can generate a time stamped report. Via line 114, host system 110 provides the TVS server a trigger of a particular time when the TVS server needs to perform some function. For instance, the system time from line 114 may trigger the TVS server to automatically generate a number of reports, some of which may be generated hourly, daily, or weekly. This is a background process that schedules the generating of reports on a periodic basis.

Line 114 is a system time line trigger by which host system 110 informs the TVS server that it is time to provide a nightly maintenance of the database itself, such as for example database 20 in FIG. 1.

The process termination trigger from line 118 by host system 110 informs the TVS server that one of its processors has terminated operation. As was mentioned previously, TVS system 16 comprises of a number of processors each mirroring the operation of the others. The system knows which processors should be running at any given time. Thus, should one of the processors terminate its operation, notification is received by the host system that operation at that processor has been terminated so that the host system can instruct the operating system to transfer the process to one of the other backup processors, or to restart the process. Host system 110 is thus an automatic failure recovery system, the process termination trigger informing the system that the process has terminated. At which time the operator of the system needs to determine what type of system error has occurred.

A system operator, designated 120, actually watches over the TVS system to make sure that it is operational. Typical error messages are provided to the operator from the TVS server via line 122. A trigger is provided by the operator to cause the system to perform some function, for example a backup process, if an error is noted, via line 124. The trigger provided to the TVS server may in fact be from the keyboard of the operator.

The TVS server also communicates with other computerized terminals, such as PCs 28, 35 and 34 shown in FIG. 1, represented simply as 28 in FIG. 4. Some of the PCs 28 in actuality connect to the TVS server via mail host 24. Those PCs, for example PC 35 and work station 36, that gather and retrieve perspective data such as rolled up statistics or CDR flat files, they may be connected directly to the TVS server. This is indicated by the remote output line 126. Line 128, on the other hand, enables the TVS server and to communicate with the remote PCs. In essence, through line 128, the TVS server can validate PC 28 so as to communicate therewith. Data can then be downloaded from PC 28 to the TVS server.

The six major functions performed by the TVS server are discussed with reference to FIG. 5. Mapping feeds process 130. Processes feeds 130 indicates that feeds are processed from CADB system 38 and COMS system 40. As shown, a country mapping feed, designated 132, is provided by CADB system 38 to map the different country codes. A second input provided to mapping feeds process 130 is the ncode data, via line 102 from COMS system 40. Switch mapping data is also provided by COMS system 40 as an input via line 134. There are two triggers provided to mapping feeds process 130. One of the triggers is from COMS system 40 to indicate that the file from COMS system 40 has arrived. This is indicated by line 104. The other trigger, via line 94, informs process 130 that the file has been provided by CADB system 38. Mapping feeds process 130 then maps the different representations of the switch name and provides that as an operator message, via line 122, to the operator. From this, errors may be generated. Furthermore, the data is provided to a store or a memory entitled state country mapping, designated as 136. Store 136 is a database file in database 20.

Figure 5:
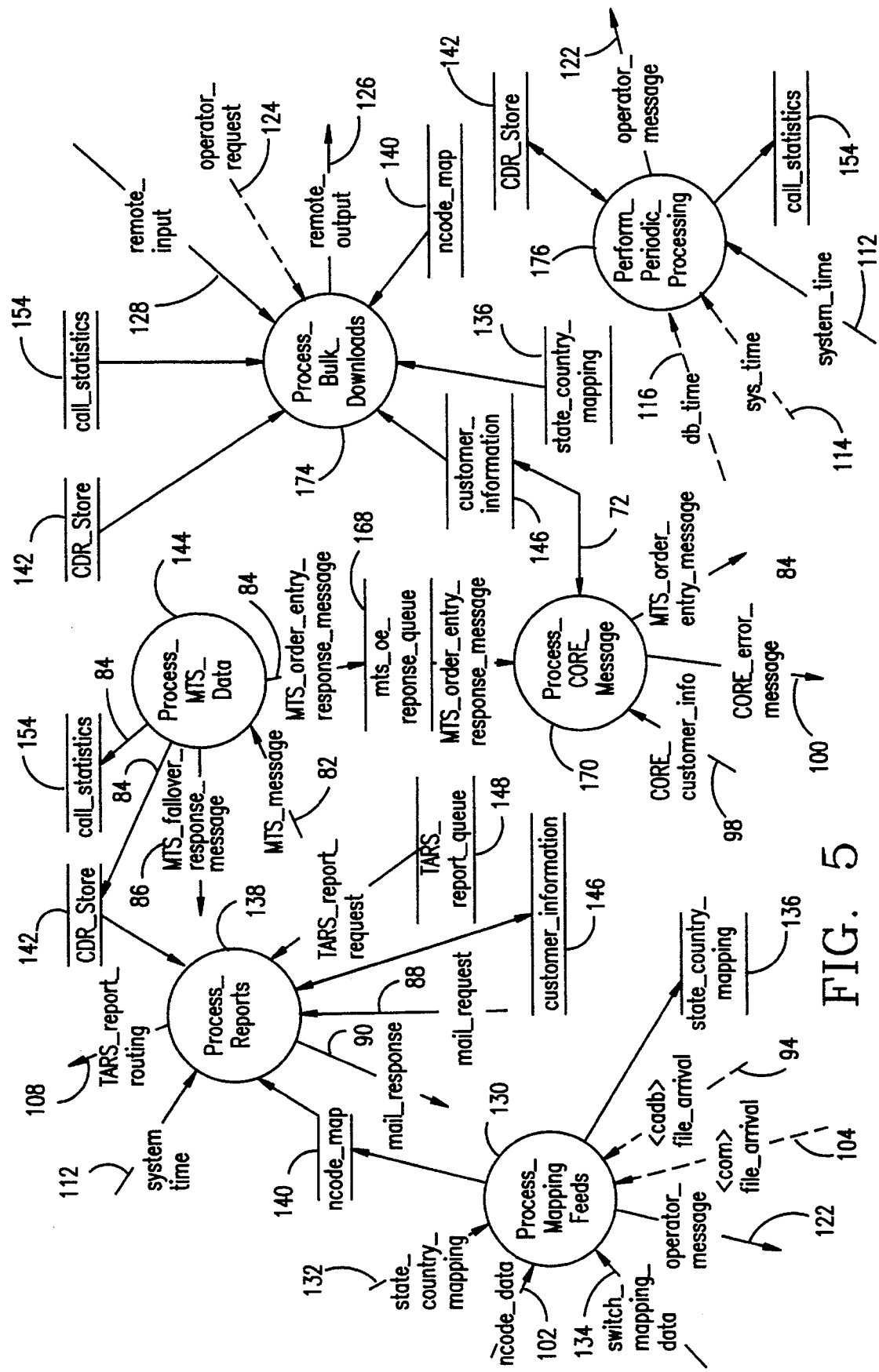
FIG. 5 is a functional diagram illustrating the major functional areas of the TVS system.

The next process that the TVS server performs is the reports process, designated 138 in FIG. 5. As its name implies, process 138 generates, upon request, on a periodic basis, a number of reports. The different functions performed by the reports process 138 will be further elaborated in FIG. 6. For now, it is suffice to note that there are a number of inputs, namely a system time provided by host system 110, via line 112, and a mail request provided by CADB system 38, via line 88, to the reports process 138. Also provided from an ncode map store 140 is an ncode map and from a CDR store 142 the requisite CDRs. Ncode map store 140 is a file which stores the different ncode maps as processed by the mapping feeds process 130. CDR store 142 is a file that contains CDRs that were fed thereto by the process performed by MTS system 12, as indicated per MTS data process 144.

Also provided as inputs to reports process 138 are data from a customer information store 146 and a TVS report queue 148. Customer information store 146 provides information about the subscribers, the type of reports that they have ordered, the special service number(s) that should be on the report and the frequency that the report should be generated, etc. TVS report queue 148 provides a buffer whereby the requested reports may be processed one at a time. Not shown but should be understood being provided to reports process 138 is a call statistics store which allows process 138 to generate reports directly from call statistics as well as the CDR records retrieved from CDR store 142. When a report is generated, process 138 outputs the report, via line 108, to RDI 106, which interfaces with mail host 24 to forward the report to the subscriber in whichever format requested by the subscriber.

Figure 6:
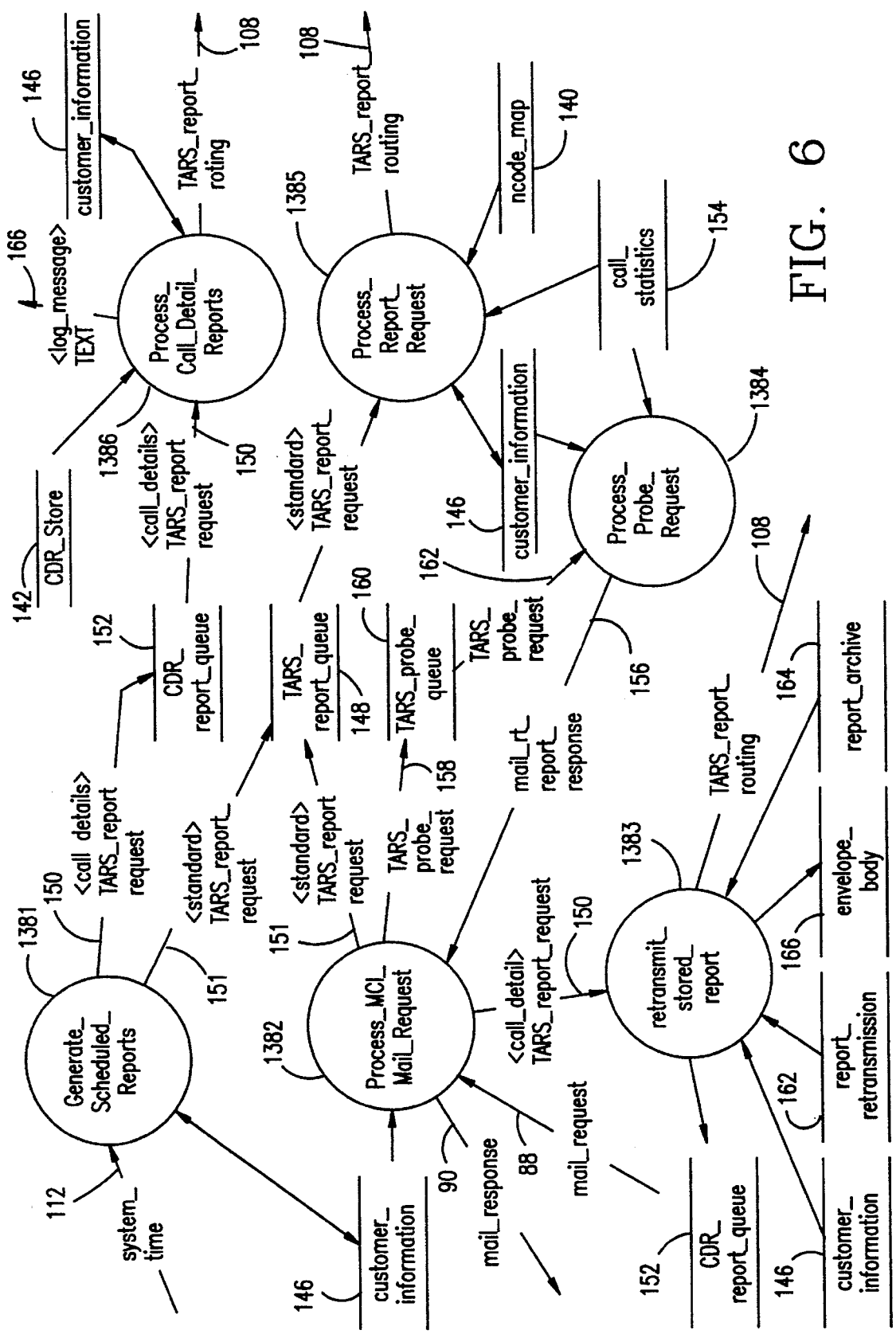
FIG. 6 is a diagram illustrating the various reports being provided by the process report function of the TVS system.

FIG. 6 illustrates the different types of reports processes that are performed in report process 138. As shown, scheduled reports are generated by subprocess 1381. It is this process that regularly scheduled reports are generated, per input of system time by the host system via line 112. Shown also being provided as an input to the scheduled report generation subprocess 1381 is the information from the subscriber fed from customer information store 146. An output from the scheduled reports subprocess 1381 is the CDR reports which are fed via line 150 to a CDR report queue 152. A standard TVS report request is routed by subprocess 1382 to TVS report queue 148.

The next subprocess under report process 138 is the mail request process 1382. In addition to receiving mail request via line 88, note that subprocess 1382 may also receive retransmission request, discussed earlier. Further shown being provided as an input to mail request subprocess 1382 is the customer information from customer store 146 and a mail report response from a probe request subprocess 1384, via line 156. If there is more than one probe request, the additional requests are provided via line 158 to a TVS probe queue 160, which in turn forwards the queued request via line 162 to probe request subprocess 1384. A standard TVS report request from the mail request subprocess 1382 is fed to the TVS report queue 148. A response is then provided by mail request subprocess 1382 to mail host 24 via line 90.

Any call detail TVS report request is provided by mail request subprocess 1382 to retransmit stored report subprocess 1383.

The stored reports may be sent to the CDR report queue 152, so that the reports are transmitted one at a time, via line 108, to RDI interface 106, and thereby to mail host 24 for delivery to the various subscribers. The report being retransmitted per store report retransmit subprocess 1383 obtains its data from a customer information store 146, a report retransmission store 162 with information pertaining to where the report is to be retransmitted, and a report archive 164 from which a previously prepared report may be retrieved. The format of the report is generated in accordance with the envelope provided by envelope body store 166.

In the probe request subprocess 1384, to send a report response to mail request subprocess 1382, probe request subprocess 1384 retrieves data from the customer information store 146 and call statistics store 154.

In report request subprocess 1385, to perform the report request, subprocess 1385 retrieves the next TVS report request from TVS report queue 148, subscriber data from customer information store 146, call statistics data from call statistics store 154 and ncode map data from ncode map store 140. The generated report TVS is routed via line 108 to RDI interface 106.

The call detail reports subprocess 1386 is the last subprocess of report process 138. For this subprocess, data is retrieved from CDR store 142 and customer information store 146. Upon receipt of the latest TVS report request via line 150 from CDR report queue 152, a call detail report subprocess 1386 generates the call detail report and sends it as a text, via line 166, to the host system for logging. In addition, the call detail report generated from subprocess 1386 is routed to RDI interface 106 via line 108, for further transmission to the requesting subscriber.

Return to FIG. 5 and focus to MTS data process 144. Process 144 receives an MTS message from MTS system 12. It is here that data from MTS system 12 is processed to generate the CDRs and call statistics, which are fed via lines 84 to CDR store 142 and call statistics store 154, both residing in MTS system 12. Any MTS fallover response message generated by MTS data process 144 is fed via line 86 to MTS system 12. The MTS order entry response message from MTS data process 144 is loaded to a MTS response queue 168, before the message is fed one at a time to call message process 170.

Call message process 170 retrieves subscriber information from customer information store 146 via line 172 and any additional subscriber information provided by the subscriber via its own computerized terminal, such as for example PC 44 shown in FIG. 1, via line 98. Any CORE error message produced by CORE message process 170 is provided via line 100 to CORE system 42. The MTS order entry message is provided via line 84 to MTS system 12.

Another process performed by the TVS server is the bulk download process 174. Here data is retrieved from CDR store 142, CORE statistics store 154, customer information store 146, state country mapping store 138 and ncode map store 140. All of that information is retrieved in response to the remote input via line 128 from a remote subscriber at a computerized terminal, such as for example PC 35 shown in FIG. 1. Bulk download process 174 begins its operation upon receipt of the trigger from the operator 124. Output from process 174 is provided via line 126 to the remote PC.

One last function performed by the TVS server that is a stand alone function is the perform periodic processing process 176. Process 176 performs predetermined maintenance and housekeeping chores. As inputs, it retrieves data from CDR store 142 and call statistics store 154, as well as system time from host system 110. Upon receipt of the triggers from lines 116 and 114, for example each night, the data retrieved from CDR store 142 and call statistics store 154 are updated and restored in the respective stores. A message is provided to the operator via line 122. System time 114 notifies process 176 to clean up the files of the system, while DB time 116 informs processing 176 to begin the database maintenance operation.

Figure 7:
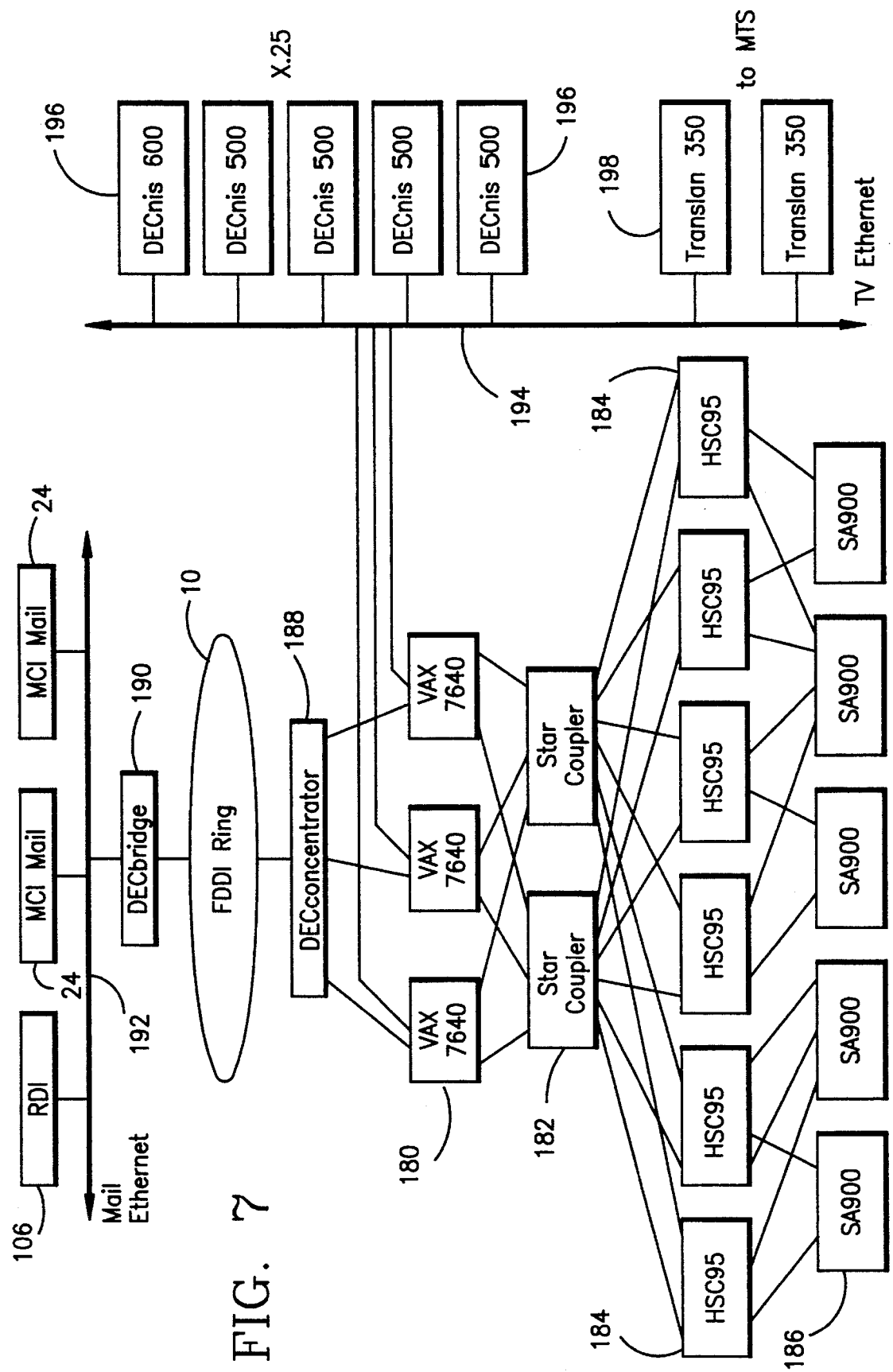
FIG. 7 shows the hardware components of a first embodiment of the TVS system of the present invention.

FIG. 7 illustrates a first embodiment of the hardware components that made up TVS system 16 of the present invention. In particular, the TVS system comprises three VAX 7640 processors 180 from the Digital Equipment Corporation. These processors are coupled by two star couplers 182 to a number of disk controllers HSC95, designated 184. Star couplers 182 provide interfacing between processors 180 and storage controllers 184, which are hierarchial storage controllers made by the Digital Equipment Corporation. Controllers 84 are in turn connected to a plurality of disk storages 186, such as the SA900 disk storage system made by the Digital Equipment Corporation. The outputs of each of the processors 180 is provided to a concentrator 188, which concentrates the respective outputs as a single output to FDDI ring 10. Concentrator 188 is made by the Digital Equipment Corporation. The output from FDDI ring 10 is provided to a bridge 190, also made by the Digital Equipment Corporation, which converts the fiber output from the TVS system into an output that is capable of being put onto the ethernet line 192. The output is then provided to RDI 106 or mail host 24 for transmission to the different subscribers of the service.

Processors 180 are moreover connected to a traffic view ethernet line 194. Connected to ethernet 194 are a plurality of network information servers 196. These information servers are conventional products made by the Digital Equipment Corporation under model number DECnis 600 and 500. Basically, servers 196 provide connectivity between an X.25 network and the ethernet 194.

Also connected to ethernet 194 are two translans 198 which connect TVS system 16 to MTS system 12. Translans 198 are also made by the Digital Equipment Corporation. Thus, for the telecommunications network of FIG. 1, the MTS system may be located remotely from the TVS system. For the FIG. 7 embodiment, all of the lines are bidirectional lines, which enable bidirectional exchange of data between the TVS system and the other systems in the telecommunications network of FIG. 1.

Figure 8:
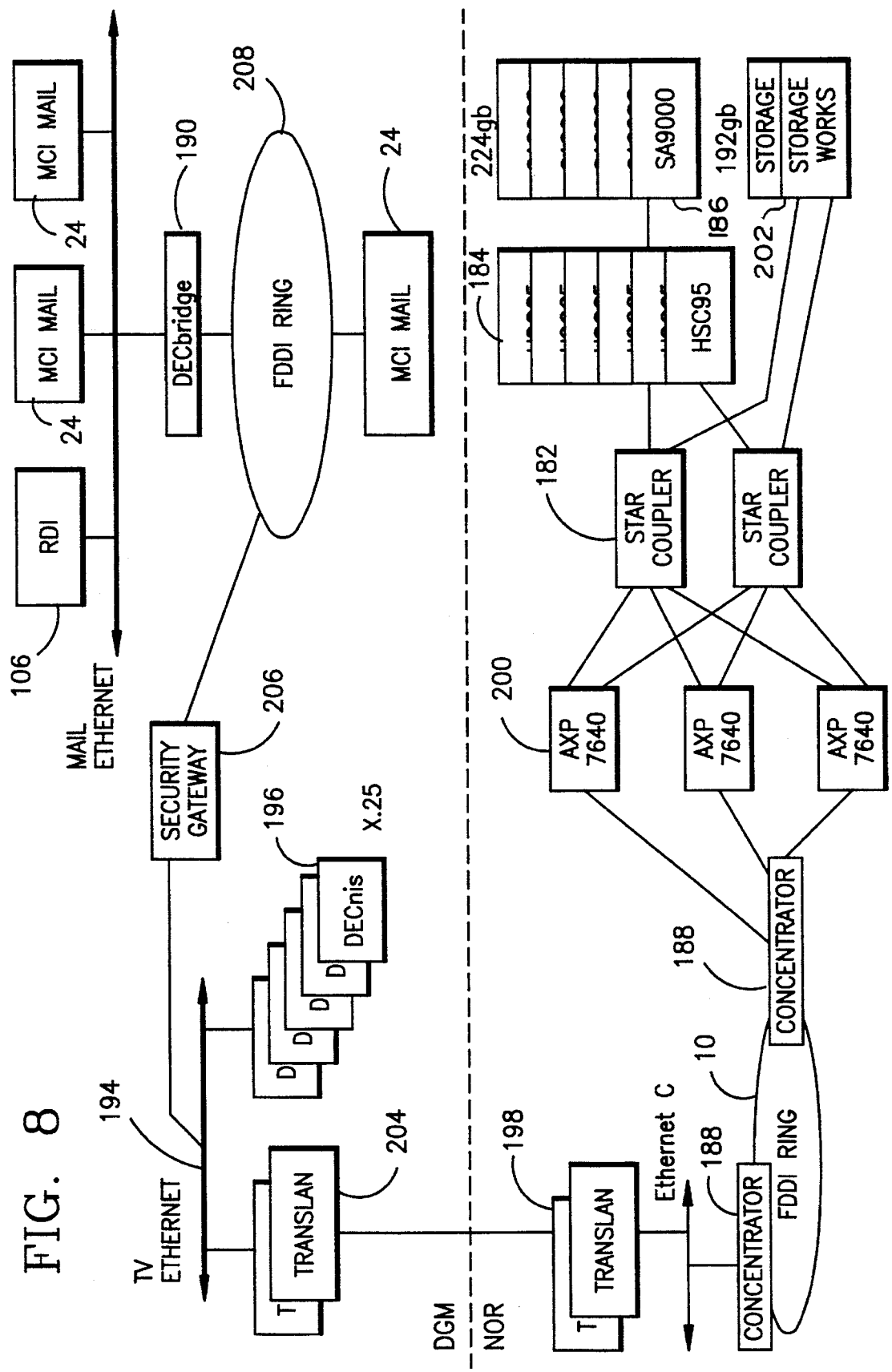
FIG. 8 is a schematic illustrating the different hardware components of a second embodiment of the TVS system of the present invention.

FIG. 8 illustrates a second embodiment of different hardware components of TVS system 16 of the instant invention. But for the type of processor used and the additional storage capacity, the FIG. 8 embodiment mirrors that of FIG. 7. In particular, in place of the VAX 7640 processors, designated 180 in FIG. 7, the processors of the TVS system of FIG. 8 are Alpha AXP7640 processors 200 made by the Digital Equipment Corporation. In addition to the change of processors, the TVS system of FIG. 8 also has increased storage capacity, as indicated by the storage works 202. The TVS system is stored in a first location named NOR and communicates with the MTS system located at DGM, via respective translans 198 and 204. Another difference between the FIG. 8 embodiment and the FIG. 7 embodiment is the security gateway 206 provided between ethernet 194 and a FDDI ring 208. Basically, security gateway 206 prevents unauthorized access to the system.

Inasmuch as the present invention is subject to many variations, modifications and changes in detail, it is intended that all matter described throughout this specification and shown in the accompanying drawings be interpreted as illustrative only and not a limiting sense. Accordingly, it is intended that the invention be limited only by the spirit and scope of the appended claims.

We claim:

1. In a telecommunications network, a system for reporting call detail statistics of special service calls, comprising:

at least one switching means for routing said calls;

processor means for determining the call details of said calls routed through said switching means;

database means for periodically collecting and storing as records the call details from said processor means for calls of at least one particular subscriber;

processing server means communicatively connected to said database means for receiving requests from said subscriber;

wherein in response to a request from said subscriber, said processing server means provides at predetermined intervals to said subscriber at least one report detailing statistics representative of said records of calls of said subscriber stored in said database means.

2. The system of claim 1, wherein said call details include at least the number of call attempts, the number of call completions, the number of call incompletes and the number of call blocks for various ones of said calls routed through from said switching means for a given period of time.

3. The system of claim 1, further comprising:

distribution means for disbursing said report to a location requested by said subscriber via E-Mail, fax transmission or hard copy.

4. The system of claim 1, wherein said report comprises a data file containing the call details of said calls of said subscriber;

said system further comprising:

at least one computer work station whereat said subscriber communicates via said network with said processing server means for receiving said data file; and wherein said subscriber can design and format a report using call detail data from said data file upon receipt of said data file.

5. The system of claim 1, further comprising:

distribution means for distributing said report;

at least one terminal electrically connected to said distribution means for retrieving for said subscriber the call details of a special service call of said subscriber for a particular time period.

6. The system of claim 1, further comprising:

at least one terminal electrically connected to and interacting with said database means for retrieving for said subscriber the call details of a special service call of said subscriber for a particular time period.

7. The system of claim 1, further comprising:

data entry processing means for said subscriber to provide said instructions to said database means to order said report.

8. The system of claim 1, further comprising:

circuit availability storage means for periodically providing said database means mapping data to correlate number plan area (NPA) to states and localities within states, and country codes to different countries, said mapping data being used to add to said report call details dealing with the various locations where calls of said subscriber originate.

9. The system of claim 1, wherein said database means comprises:

a plurality of processors each operating same applications, said processors connected via at least one communication line to a distribution means to provide said report to and communicate with said subscriber;

a plurality of memory means coupled to each of said processors for storing the call details of calls of said subscriber.

10. A system for viewing traffic statistics of special service calls for a plurality of subscribers in a telecommunications network having a plurality of switching means, comprising:

counting means for counting the calls being routed by said switching means and retrieving the call details of said special service calls;

processing means for collecting from said counting means the call details of respective ones of said special service calls associated with corresponding ones of said subscribers, said processing means being adapted to communicate with said subscribers;

database means associated with said processing means for storing the collected call details of said respective ones of said special service calls as a plurality of call detail records;

wherein said processing means outputs at least one report of call detail records associated with one of said special service calls of a corresponding one of said subscribers to said one subscriber in response to requests input to said processing means by said one subscriber so that the traffic statistics related to said one special service call of said one subscriber is presented to said one subscriber for viewing.

11. The system of claim 10, wherein said counting means is connected to said switching means via a data interface means; and wherein said processing means communicates with said subscribers via a data host.

12. The system of claim 10, wherein the call details for each of said special service calls includes at least the number of call attempts, the number of call completions, the number of call incompletes and the number of blocked calls related to said each call from said switching means for a given time period.

13. The system of claim 10, further comprising:

a plurality of work stations whereat respective ones of said subscribers retrieves call details of special service calls subscribed to by said subscribers from said processing means to effect corresponding reports.

14. The system of claim 10, further comprising:

data entry processing means for said subscribers to enter respective specialized request to said processing means for retrieving corresponding specialized reports of call details stored in said database means.

15. The system of claim 10, further comprising:

circuit availability storage means for periodically providing said database means mapping data to correlate number plan area (NPA) to states and cities or other municipalities within states, and country codes to different countries, said mapping data being used to add call details dealing with the various locations where calls of said subscriber originate.

16. The system of claim 10, further comprising:

a plurality of computerized terminals connected to said network to communicate with a data distribution host connected to said processing means so that the call details associated with any one special service call subscribed by any one of said subscribers can be retrieved by said any one subscriber from said database means for a given time period.

17. The system of claim 10, further comprising:

data entry processing means for said subscribers to enter respective request to said processing means to order reports relating to traffic statistics of corresponding special service calls.

18. The system of claim 10, further comprising:

circuit availability storage means for periodically providing said database means mapping data to correlate number plan area (NPA) to states and localities within states, and country codes to different countries, said mapping data adding call details dealing with the various locations where said special service calls originate.

19. In a telecommunications network, a method of reporting call detail statistics of special service calls comprising the steps of:

(a) processing the call details of said special service calls routed through a plurality of switching means;

(b) periodically collecting and storing as records in a database means the call details of special service calls for at least one subscriber;

(c) receiving at a processor server means at least one request from said one subscriber on how and when to disseminate the call details of special service calls subscribed by said one subscriber;

(d) said processing server means providing said one subscriber, per said at least one request from said one subscriber, at predetermined time intervals at least one report of records stored in said database means of call details of special service calls of said one subscriber.

20. The method of claim 19, wherein said step (a) includes the steps of:

counting at least the number of call attempts, the number of call completions, the number of call incompletes and the number of call blocks for various ones of said calls routed through said switching means for a given period of time.

21. The method of claim 19, wherein said step (d) further comprises the step of:

distributing said report to a location requested by said one subscriber via E-Mail, fax transmission or hard copy.

22. The method of claim 19, wherein said report comprises a data file containing the call details of said calls of said one subscriber, and wherein for said subscriber, said method further comprising the steps of:

using at least one computer work station to communicate with said database means for receiving said data file; and upon receipt of said data file, designing and formatting a report using the call detail data from said data file.

23. The method of claim 19, further comprising the step of:

using at least one computerized terminal in communication with a distribution means for retrieving for said one subscriber the call details of a special service call of said one subscriber for a particular time period.

24. The method of claim 19, further comprising the step of:

using at least one computerized terminal in communication with said database means for retrieving for said one subscriber the call details of a special service call of said one subscriber for a particular time period.

25. The method of claim 19, further comprising the step of:

providing a data entry processing means for said one subscriber to enter said request to said database means to order said report.

26. The method of claim 19, further comprising the step of:

periodically providing said database means mapping data to correlate number plan area (NPA) to states and localities within states, and country codes to different countries, said mapping data adding to said report call details dealing with the various locations where calls of said subscriber originate.

27. A method of viewing traffic statistics of special service calls for a plurality of subscribers in a telecommunications network having a plurality of switching means, comprising:

(a) counting the calls being routed by said switching means and retrieving the call details of said special service calls;

(b) collecting from said counting step the call details of respective ones of said special service calls associated with corresponding ones of said subscribers;

(c) storing the collected call details of said respective ones of said special service calls in a database means as a plurality of call detail records;

(d) outputting at least one report of call detail records associated with one of said special service calls of a corresponding one of said subscribers stored in said database means to said one subscriber in response to requests by said one subscriber to said database means so that the traffic statistics related to said one special service call of said one subscriber is presented to said one subscriber for viewing.

28. The method of claim 27, wherein said step (a) further comprises the steps of:

interfacing with said switching means via a data interface means; and communicating with said subscribers via a data host.

29. The method of claim 27, wherein said step (b) further comprises the steps of:

collecting from the call details for each of said special service calls at least the number of call attempts, the number of call completions, the number of call incompletes and the number of blocked calls related to said each call from said switching means for a given time period.

30. The method of claim 27, further comprising the step of:

establishing a plurality of work stations at various locations of said network so that respective ones of said subscribers can retrieve stored call details of respective special service calls to effect corresponding reports.

31. The method of claim 27, wherein step (c) further comprises the step of:

adding a data entry processing means to said network to enable said subscribers to enter respective specialized instructions for retrieving corresponding specialized reports of call details stored in said database means.

32. The method of claim 27, further comprising the step of:

periodically providing said database means mapping data to correlate number plan area (NPA) to states and other localities within states, and country codes to different countries, said mapping data adding to said records call details dealing with the various locations where calls of said subscribers originate.

33. The method of claim 27, further comprising the steps of:

interfacing a data distribution host to said database means; and connecting a plurality of computerized terminals to said network to communicate with said data distribution host so that any one of said subscribers can retrieve the call details associated with any one special service call of said any one subscriber from said database means for a given time period.

34. The method of claim 27, further comprising the step of:

adding a data entry processing means to said network to enable said subscribers to enter respective instructions to order reports relating to traffic statistics of corresponding special service calls.

35. The method of claim 27, further comprising the step of:

periodically providing said database means mapping data to correlate number plan area (NPA) to states and localities within states, and country codes to different countries, said mapping data adding call details dealing with the various locations where said special service calls originate to said records.

* * * * *